US008991139B2

(12) United States Patent
Poussin et al.

(10) Patent No.: US 8,991,139 B2
(45) Date of Patent: Mar. 31, 2015

(54) DEVICE FOR FILLING A CONTAINER WITH SOLID PARTICLES, THE DEVICE INCLUDING A DIAPHRAGM

(75) Inventors: Bernard Poussin, Carrières sur Siene (FR); Guillaume Poussin, Bougival (FR)

(73) Assignee: Crealyst, Semur-en-Vallon (FR)

( * ) Notice: Subject to any disclaimer, the term of this patent is extended or adjusted under 35 U.S.C. 154(b) by 0 days.

(21) Appl. No.: 13/992,860

(22) PCT Filed: Dec. 9, 2010

(86) PCT No.: PCT/FR2010/052659
§ 371 (c)(1),
(2), (4) Date: Jul. 19, 2013

(87) PCT Pub. No.: WO2012/076761
PCT Pub. Date: Jun. 14, 2012

(65) Prior Publication Data
US 2013/0298507 A1    Nov. 14, 2013

(51) Int. Cl.
*B65G 69/04*    (2006.01)
*B01J 4/00*    (2006.01)
(Continued)

(52) U.S. Cl.
CPC . *B65B 1/04* (2013.01); *B01J 8/002* (2013.01); *B01J 8/003* (2013.01); *B01J 2208/00769* (2013.01); *B01J 2208/00778* (2013.01); *B65G 69/0441* (2013.01)
USPC ............... 53/235; 53/473; 222/71; 222/139; 222/548

(58) Field of Classification Search
USPC ......... 53/473, 235, 237, 55; 222/139, 548, 71
IPC ...... B01J 2208/0743,228/0769; B65G 68/0458, B65G 69/0475, 2201/042
See application file for complete search history.

(56) References Cited

U.S. PATENT DOCUMENTS 909,657 A * 1/1909 Patterson .................. 222/183
1,559,905 A * 11/1925 Moorman ................ 222/185.1
(Continued)

FOREIGN PATENT DOCUMENTS

CN    1061940 A    6/1992
CN    2436484 Y    6/2001
(Continued)

OTHER PUBLICATIONS

Mar. 4, 2011 International Search Report issued in International Application No. PCT/FR2010/052659 (with translation).
(Continued)

*Primary Examiner* — Christopher Harmon
(74) *Attorney, Agent, or Firm* — Oliff PLC

(57) ABSTRACT

The invention relates to a device for filling a container with solid particles, the device having annular ducts for passing particles, which ducts are defined by a plurality of vertical nozzles arranged coaxially relative to one another, and a diaphragm arranged upstream from the annular ducts for regulating the flow rate of particles in the annular ducts, the diaphragm has a plurality of shutter flaps for shutting off the annular ducts, each flap shutting off an angular sector of a single annular duct and the diaphragm having control means for controlling movement of the shutter flaps that are configured to be capable of partially shutting off any one of duct independently of the other ducts. The invention also relates to a method of shutting off a filler device.

18 Claims, 3 Drawing Sheets

(51) Int. Cl.
  *B01J 8/00*   (2006.01)
  *B65B 1/04*   (2006.01)

(56) References Cited

U.S. PATENT DOCUMENTS

| | | | | |
|---|---|---|---|---|
| 3,652,131 A | * | 3/1972 | Carlsson | 406/181 |
| 4,029,220 A | * | 6/1977 | Greaves | 414/206 |
| 4,172,028 A | * | 10/1979 | Dunn | 209/12.2 |
| 4,259,181 A | * | 3/1981 | Leon et al. | 209/231 |
| 4,399,846 A | * | 8/1983 | De Souza Dias et al. | 141/192 |
| 4,497,605 A | * | 2/1985 | Bukkems et al. | 414/218 |
| 4,785,976 A | | 11/1988 | Bennie et al. | |
| 4,793,525 A | * | 12/1988 | Kaufmann | 222/333 |
| 5,244,129 A | | 9/1993 | Poussin et al. | |
| 5,740,660 A | * | 4/1998 | Rowe | 53/454 |
| 5,906,229 A | * | 5/1999 | Haquet et al. | 141/286 |
| 2007/0181612 A1 | | 8/2007 | Poussin | |
| 2007/0228078 A1 | * | 10/2007 | Sanders | 222/146.1 |
| 2007/0297880 A1 | * | 12/2007 | Pinon et al. | 414/301 |
| 2011/0061345 A1 | * | 3/2011 | Cherukuri et al. | 53/473 |

FOREIGN PATENT DOCUMENTS

| | | |
|---|---|---|
| EP | 0 482 991 A1 | 4/1992 |
| FR | 2 862 625 A1 | 5/2005 |

OTHER PUBLICATIONS

Jun. 9, 2013 Written Opinion issued in International Application No. PCT/FR2010/052659.

* cited by examiner

US 8,991,139 B2

DEVICE FOR FILLING A CONTAINER WITH SOLID PARTICLES, THE DEVICE INCLUDING A DIAPHRAGM

FIELD OF THE INVENTION

The present invention relates to the field of filling containers with solid particles such as grains or granules. By way of example, such containers may be reactors in the oil or chemical industry or they may be silos for storing cereals, fertilizer, or any other substance in the form of solid particles.

BACKGROUND OF THE INVENTION

Such containers are filled by pouring solid particles from hoppers or funnels that serve to pour the particles into a container via flexible sleeves or rigid pipes.

In general, it is desired to fill a container with as much solid substance as possible and to have the solid particles distributed as uniformly as possible in terms of grain size so as to approach as closely as possible to the theoretically-determined filling optimum.

In particular with chemical reactors, it is advantageous to have as large as possible a weight of catalyst in the reactor in order to be able to space out stoppages of the equipment associated with replacing the catalyst. It is also important to have a uniform distribution of grain sizes throughout the reactor in order to avoid preferred paths appearing for the reagents that are to pass through the catalyst bed, since otherwise only a fraction of the catalyst will be used. That would make it necessary to replace the catalyst even though some of it has not been used, since if the catalyst is not replaced the desired chemical reaction can no longer take place, and it should not be forgotten that the catalyst is relatively expensive.

The same applies to silos for storing grains in which it is necessary to be able to store as large as possible a quantity of grains, while avoiding phenomena of segregation by grain size, since that can lead to zones of greater density that can no longer be reached by preservatives.

It is also desired to reduce as much as possible any abrasion and impacts between solid particles or against the filler device so as to avoid as much as possible any production of fine dust that impedes proper operation of the equipment and interferes with the solid particles being distributed uniformly in terms of grain size inside the container.

Document FR 2 862 625 discloses a device for filling a container with solid particles, which device is provided under its hopper with downwardly-flaring concentric tubes, and also with straight concentric tubes that are capable of moving vertically relative to one another and that enable the solid particles to be distributed better within the container.

A problem lies in the fact that, depending on particle size, certain concentric tubes can become clogged during filling, because they are not sufficiently open, such that the filling that is obtained is not optimum and it is difficult to obtain control over filling parameters.

OBJECT AND SUMMARY OF THE INVENTION

A particular object of the present invention is to provide a container-filler device that is reliable, effective, and simple to control.

To this end, the invention provides a device for filling a container with solid particles, the device comprising:
 annular ducts for passing particles in order to dispense particles uniformly in the container, the ducts being defined by a plurality of vertical nozzles arranged coaxially relative to one another; and
 a diaphragm arranged upstream from the annular ducts in order to regulate the flow of particles in the annular ducts;
 wherein the diaphragm has a plurality of shutter flaps for shutting off the annular ducts, each shutting of an angular sector of a single annular duct, and wherein the diaphragm has control means for controlling the movement of the shutter flaps, and configured to enable any one duct to be shut off partially independently of the other ducts.

By means of the invention, a device is obtained for reliably filling a container with solid particles regardless of the size of the particles. The flow rate in each annular duct is regulated with the help of shutter flaps. Each annular duct has a plurality of shutter flaps, i.e. at least two of them, each flap covering an angular sector of the annular duct. By moving the shutters relative to one another, it is possible for any one annular duct to modify the fraction of the annular duct that is open to allow solid particles to pass through, thereby shutting off the duct, at least in part. It can be understood that it is possible for an annular duct to be shut off completely.

Thus, the diaphragm serves to control the flow rate of solid particles in each annular duct for passing particles, and to do so independently for each duct. Partially shutting off any one duct has no effect on the extent to which any other duct is shut off, and in particular has no effect on shutting off the portion of a duct that is adjacent in the radial direction and that lies in the same angular sector as the angular sector shut off by the shutter flap. In other words, by means of the above device, there is no need for all of the ducts to be open with the same open fraction.

By controlling the flow rate through each annular duct separately, it is possible in flexible manner to modulate the distribution of solid particles in each annular duct and thus to avoid effects of these ducts becoming blocked.

It is also possible to modulate the flow of particles in each annular duct over time so as to decrease or increase the flow rate of solid particles in one or another annular duct as a function of the filling of the container. Depending on the filling of the container, in order to obtain a uniform distribution of particles in the container, it must be possible to increase the flow rate of solid particles in certain annular ducts, or conversely to decrease it or even to stop it.

For example, it is possible to open a duct close to the center to a certain fraction that is large enough to avoid particle blockage and/or to have a flow rate that is greater than further out (the ducts close to the center generally being of smaller sectional area than the ducts further out), while simultaneously opening a duct close to the outside to a smaller fraction, so as to enable distribution to be more uniform throughout the container (with it thus being possible for each zone of the container, whether central or off-center, to be filled at a similar rate even though the annular ducts do not present the same sectional areas).

It should also be observed that the shutter flaps, and thus the diaphragm, lie in a plane that is substantially horizontal. There is thus no need to move the ducts vertically relative to one another. The flow section for particles is thus horizontal and not vertical, thereby increasing flow rate and better avoiding blockages.

This device also makes it possible to provide a standard device that is easily adaptable to solid particles of different shapes. For example, solid particles that are rod-shaped, i.e. that are long relative to their section, do not flow in the same way as solid particles that are spherical. It can therefore be advantageous to close off one annular duct in part or in full, while controlling the flow rate of solid particles passing through the other duct. It should be observed that it may be advantageous to close off a duct completely in order to adapt the filling to the size of the container. In particular for a container that is relatively small, it is possible to close off the outer duct so as to prevent too many particles being dispensed towards the edges of the container.

The device may also include one or more of the following characteristics.

The control means comprise at least two handles, each handle being configured to control the shutting off of a single annular duct. Thus, each handle is associated with a respective duct. In other words, the control means for shutting off one duct are distinct from the control means for shutting off another duct, and each duct has control means that are specific thereto. This makes it easy to control the flow of solid particles in each annular duct.

For each annular duct, the diaphragm comprises an annulus carrying a plurality of flaps distributed in uniform manner on the annulus, with the number of flaps lying for example in the range 2 to 20. Thus, the distribution of particles in each annular duct is more uniform. The openings in the diaphragm for each annular duct are distributed uniformly all around the duct.

The diaphragm has at least two annuluses of the same diameter mounted to pivot relative to each other about a common axis of rotation and suitable for shutting off the same annular duct, at least in part, by pivoting relative to each other. For example, one of the annuluses may be mounted to be stationary relative to the device, and merely moving the other annulus relative to the first annulus by pivoting it under the control of the control means serves to shut off one of the ducts in full or in part.

The diaphragm has a single common handle for controlling the relative pivoting of a plurality of same-diameter annuluses. Thus, in order to shut off only one annular duct, the diaphragm may have a plurality of same-diameter annuluses, each carrying shutter flaps arranged so as to be capable of pivoting relative to one another in order to shut off the annular duct, at least in part. The pivoting of the annuluses relative to one another is controlled by single control means for all of the annuluses having the same diameter. Thus, control over the opening or the shutting of an annular duct is performed in simple manner by actuating a single handle for a given duct.

Each shutter flap is a rigid wall carried by at least one annulus and configured to shut off an angular sector of a single annular duct.

Each shutter flap is a flexible wall carried by two same-diameter annuluses mounted to pivot relative to each other. The shutter flaps have one end that is stationary relative to the first annulus and an opposite end that is stationary relative to the second annulus. When the two ends are close together, the annular duct is not shut off. When it is desired to reduce the flow rate of solid particles through a given annular duct, one of the annuluses is caused to pivot relative to the other about their common axis, thereby deploying the flexible shutter flaps that open and shut off angular sectors of the annular duct.

The downstream ends of the vertical nozzles are flared so as to allow the particles to flow in fluid manner and so as to avoid sudden changes in the flow direction of the solid particles, where such changes could lead to undesirable friction and head losses. It is desired to avoid friction between particles or against the device breaking particles and creating dust. Dust is harmful for proper operation of the device and leads to additional problems in obtaining a uniform distribution of particles in the container. Dust also runs the risk of creating regions that cannot be reached by some other substance (reagent and/or preservative).

The device includes jets of gas placed in register with the downstream ends of the vertical nozzles and forming means for propelling solid particles. These propulsion means serve to distribute the solid particles over the entire section of the container by propelling these particles towards the edges of the container. This avoids as much as possible mechanical friction of the solid particles against parts of the device.

The device includes solid particle distributor means thus making it possible to dispense the solid particles uniformly when they leave the flared portions of the nozzles.

The distribution means include at least one turntable carrying at its periphery brushes or soft and flexible bristles. Without increasing the size of the distributor device, it is thus possible to fill containers that are of diameter that is large compared with the diameter of the filler device.

The present invention also provides a method of shutting off a device for filling a container with solid particles, in which method an annular duct is shut off at least in part without thereby changing the extent to which any other annular duct is shut off.

BRIEF DESCRIPTION OF THE DRAWINGS

The invention can be better understood on reading the description that follows given purely by way of example and with reference to the drawings, in which.

MORE DETAILED DESCRIPTION

Figure 1:
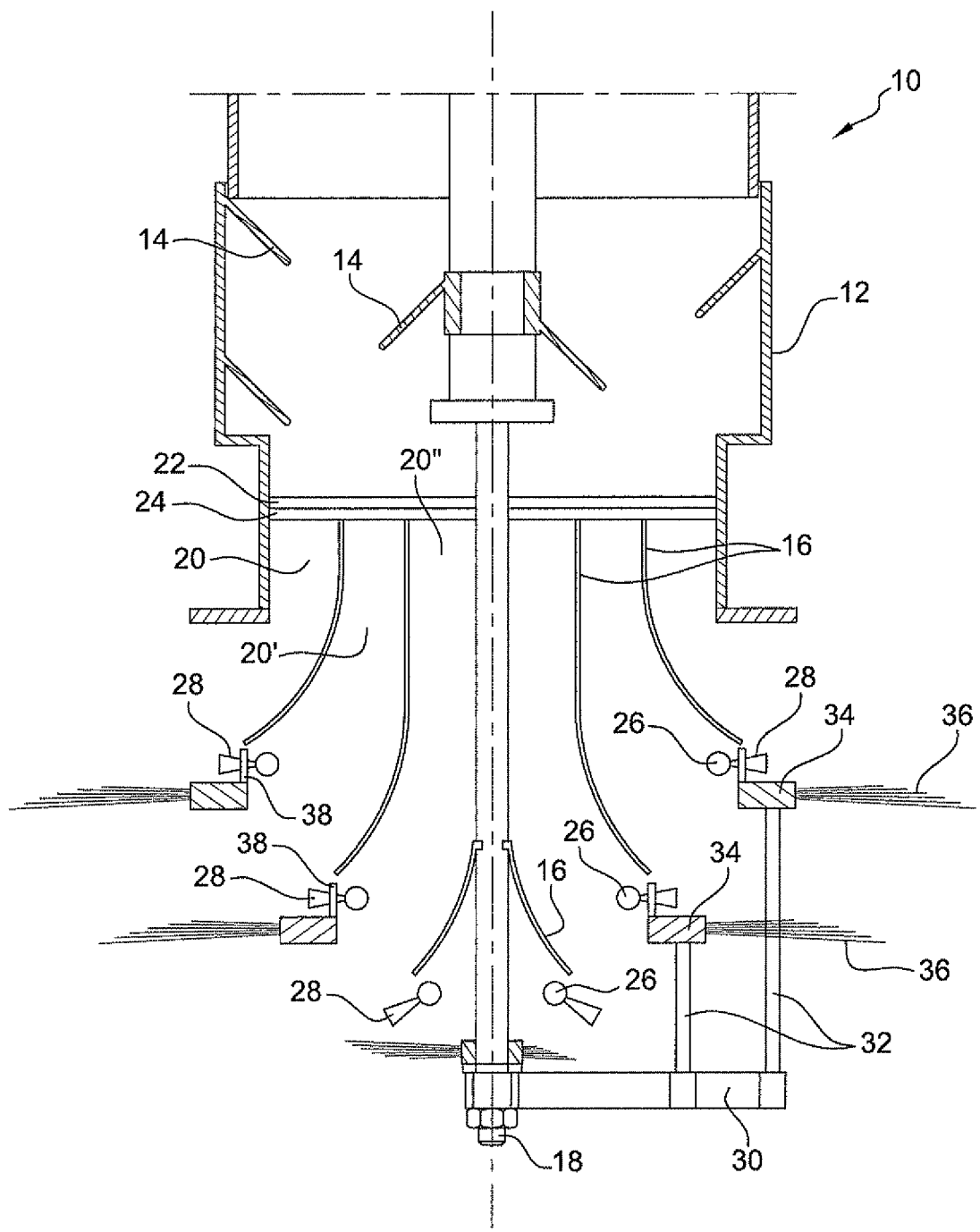
FIG. 1 is a diagrammatic axial section view of a device in an embodiment.

FIG. 1 shows a device 10 for filling a container (not shown) with solid particles, the device comprising a tank 12 receiving the solid particles in bulk. In this example, the particles are granules of catalyst for a petrochemical reactor. It should be observed that the diameter of the container that is to be filled with the solid particles may be large relative to the diameter of the device. Thus, the diameter of the container that is to be filled may lie in the range 0.5 meters (m) to 15 m, while the outside diameter of the device may lie in the range 0.1 m to 2.5 m.

In the embodiment described herein, the tank 12 has brush deflectors 14 that serve to distribute the solid particles by deflecting the flow and causing the solid particles to be mixed together, before they are dispensed into the container. The flow of solid particles in the tank tends to cause the particles to be segregated: the longer particles go preferentially towards the outer walls of the tank, while the shorter particles tend to go towards the center of the tank.

In this bottom or downstream portion, the tank 12 leads to a plurality of vertical nozzles 16 arranged coaxially one within another.

It should be observed that the terms "downstream" and "upstream" are used for the ends of elements in the device with reference to the flow direction of the solid particles through the device.

The device 10 also has a central rod 18. The walls of the tank 12, the vertical nozzles 16, and the central rod 18 define between them annular ducts 20, 20', and 20" for passing particles. In this example, the device has three annular ducts 20, 20', and 20" defined by three vertical nozzles 16 and an axial central rod 18.

Upstream from the annular ducts 20, 20', and 20", and thus upstream from the nozzles 16, the device 10 has a diaphragm 22 for regulating the flow of particles into the annular duct. Under the diaphragm 22, the device also has a diaphragm support 24 having substantially the same shape as the diaphragm 22 and having the nozzles 16 attached thereto. For example, the nozzles 16 may be welded to the support 24. The nozzles 16 may also be attached to the central rod 18, as can be seen in FIG. 1.

The downstream ends of the vertical nozzles 16 are flared so as to allow particles to flow in fluid manner and so as to avoid any sudden changes in the flow direction of the solid particles, which changes might lead to undesirable friction and head losses.

At its downstream end, the device may also include propulsion means for propelling and for distributing the solid particles.

For example, the propulsion means may comprise a plurality of substantially horizontal circular tubes 26 situated in register with the downstream ends of the nozzles 16. In other words, these tubes 26 are situated close to the flared ends of the nozzles 16, and more precisely downstream from said ends. The tubes 26 are fed with gas under pressure and they are perforated to allow jets of gas 28 to pass towards the outside of the device.

Thus, by virtue of these gas jets, the solid particles leaving the flared portions of the nozzles 16 are propelled away from the filler device so as to reach all regions of the container. Because of these propulsion means, mechanical friction is avoided in effective manner between the propulsion means and the solid particles, thereby serving in particular to reduce the fragmentation of the solid particles and/or the formation of dust.

The solid particle distributor means may comprise an arm 30 carried by the downstream end of the central rod 18. The arm 30 carries rods 32 carrying circular rings 34 extending mainly in the horizontal direction. These rings 34 are positioned close to the flared ends of the nozzles 16 and preferably downstream from the circular tubes 26. On its outside surface, each ring 34 preferably carries deflector brushes 36 extending in a substantially horizontal direction.

These brushes 36, like the brushes 14, are made up of bristles that are soft and flexible and of various shapes.

When the central rod 18 is rotating, these distributor means serve to distribute the solid particles within containers of large diameter.

Each ring 34 may also carry a circular wall 38 on its inside face, which wall 38 is substantially vertical and extends upstream, being perforated by a plurality of orifices that are uniformly distributed all around its circumference. This wall 38 faces the gas jets 28 and serves to pass or block a gas jet during rotation of the central rod 18.

Figure 2:
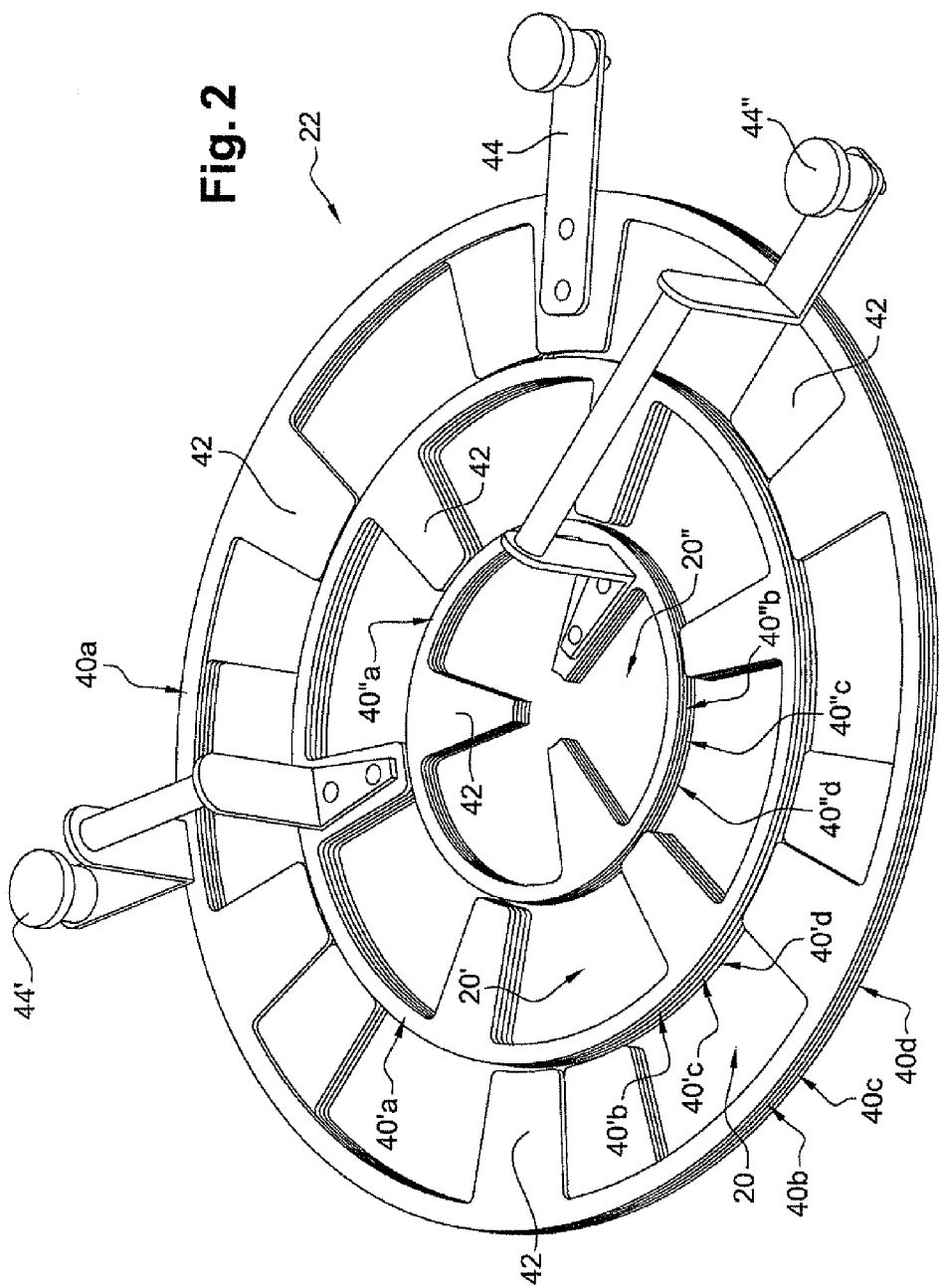
FIG. 2 is a diagrammatic perspective view of a diaphragm of the FIG. 1 device, in which only the flaps of the outer duct are deployed in part.
Figure 3:
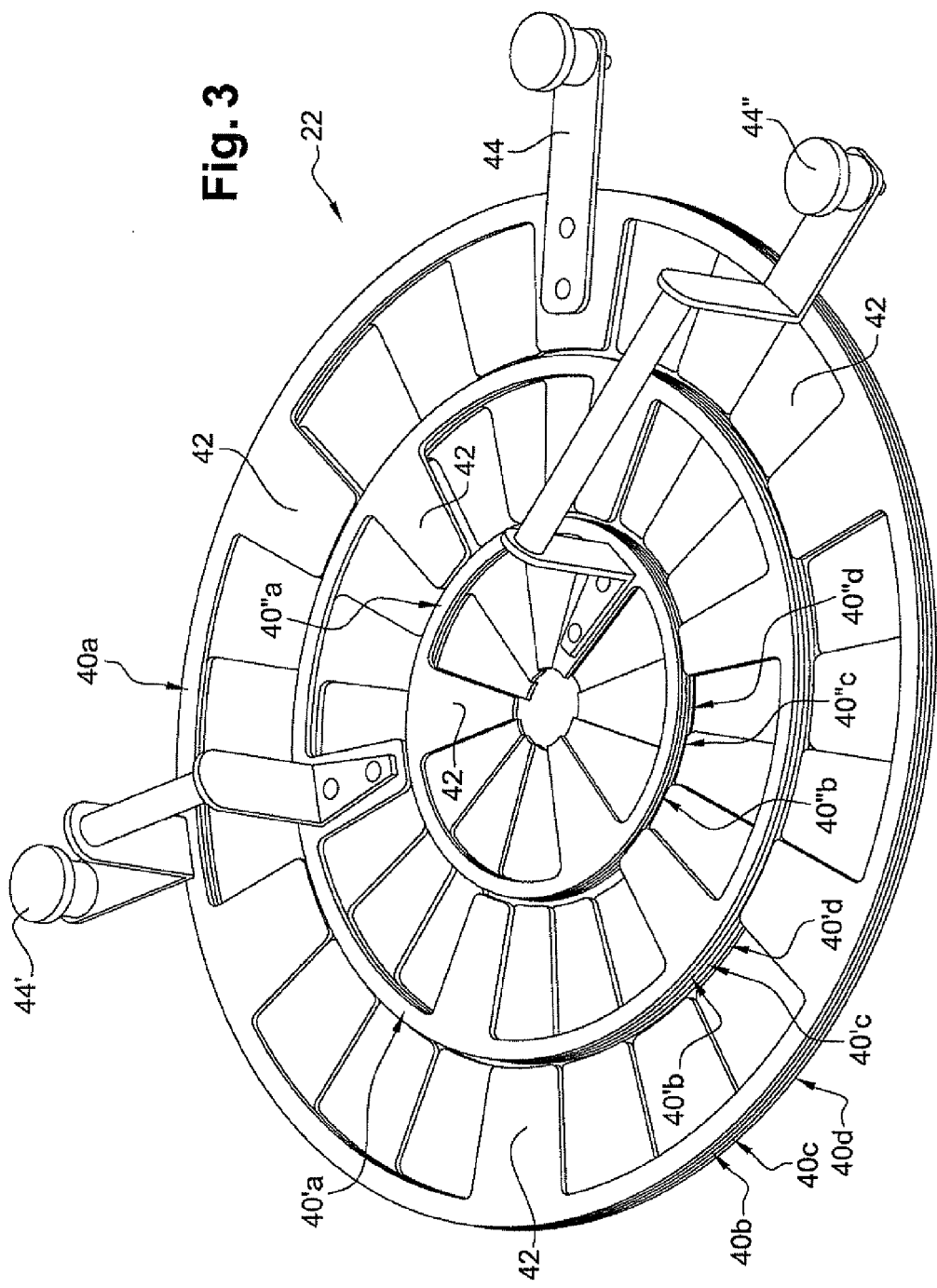
FIG. 3 is a diagrammatic perspective view of the FIG. 2 diaphragm in which all of the flaps are closed.

FIGS. 2 and 3 show the diaphragm 22. For each annular duct 20, 20', and 20" for passing solid particles, the diaphragm 22 has a plurality of annuluses 40a, 40b, 40c, 40d, 40'a, 40'b, 40'c, 40'd, 40"a, 40"b, 40"c and 40"d. These annuluses are grouped together as annuluses having the same diameter so as to be superposed. Thus, the annuluses 40a, 40b, 40c, and 40d have the same diameter, as do the annuluses 40'a, 40'b, 40'c, and 40'd, and as do the annuluses 40"a, 40"b, 40"c and 40"d. In this example, the annuluses are grouped as three groups of four same-diameter annuluses, each annulus group corresponding to one of the annular ducts 20, 20', 20" that it closes off at least in part, and its center coincides with the axis of the central rod 18. In other words, the annuluses 40a, 40b, 40c, and 40d have an outside diameter that is substantially identical to the outside diameter of the duct 20, the annuluses 40'a, 40'b, 40'c, and 40'd have an outside diameter substantially identical to the outside diameter of the duct 20', and the annuluses 40"a, 40"b, 40"c and 40"d have an outside diameter substantially identical to the outside diameter of the duct 20". Furthermore, annuluses having the same diameter, e.g. the annuluses 40a, 40b, 40c, and 40d are mounted to pivot relative to one another, each having a plurality of shutter flaps 42 arranged in regular manner along the circumference of each annulus 40a, 40b, 40c, and 40d. Each flap 42 is substantially trapezoidal in shape. For each annular duct 20, 20', 20", one of the annuluses is mounted stationary relative to the device, specifically the annuluses 40d, 40'd, and 40"d are mounted stationary.

In addition, each flap 42 may be defined by an outer edge and an inner edge. The outer edge of each flap forms part of the annulus that carries the flap 42. The inner edge of each flap 42 lies on a circle having a diameter substantially identical to the inside diameter of the duct that the flap 42 shuts off at least in part. For example, a flap 42 carried by the largest-diameter annulus 40a has a portion of the annulus 40a as its outer edge and presents an inner edge lying on a circle having a diameter that is substantially identical to the inside diameter of the duct 20, which in turn substantially coincides with the outside diameter of the adjacent duct 20'.

Each flap 42 thus shuts off an angular sector of a single annular duct 20, 20', 20". Thus, a flap 42 cannot shut off, even in part, a duct that is adjacent to the duct for which it shuts off an annular sector. For example, a flap 42 shutting off a sector of the duct 20 cannot shut off any part of the duct 20'.

In the embodiment shown in FIGS. 2 and 3, the flaps 42 are rigid walls.

The number of flaps 42 carried by each annulus may lie in the range 2 to 20. For example, as can be seen in FIGS. 2 and 3, each of the annuluses 40a, 40b, 40c, 40d; 40'a, 40'b, 40'c, 40'd of the two outer ducts 20 and 20' carry six shutter flaps 42, whereas each of the annuluses 40"a, 40"b, 40"c, and 40"d of the duct 20" closest to the central rod 18 has three flaps 42. The number and the dimensions of the shutter flap 42 are selected as a function of the size of the filler device, of the size of the container that is to be filled, and of the dimensions of the solid particles.

In FIG. 2, only the shutter flaps 42 of the outermost through duct 20 of the diaphragm 22 are deployed in part. In FIG. 3, the diaphragm 22 does not allow any solid particle to pass through the ducts 20, 20', and 20", since all of the flaps 42 are fully deployed.

For each annular duct 20, 20', 20", the diaphragm also has control means for moving the shutter flaps 42. By way of example, these control means are handles 44, 44', and 44". Each handle 44, 44', 44" controls the shutting off of only one annular duct 20, 20', and 20" and is secured to a respective one of the annuluses 40a, 40'a, and 40"a.

Furthermore, for each annular duct 20, 20', 20n, the diaphragm has a plurality of annuluses, one of which, 40d, 40'd, 40"d is stationary relative to the shaft 18 and another of which 40a, 40'a, 40"a carries the control means 44, 44', or 44" for moving the annuluses.

The operation of the diaphragm 22 is described below.

An annular duct 20, 20', 20" is shut off by pivoting the annuluses of that annular duct 20, 20', or 20" relative to one another. For simplification purposes, operation is described for the duct 20, however the same operation applies to the other ducts.

In the maximally open position of the annular duct 20, the annuluses 40a, 40b, 40c, and 40d of that annular duct are arranged in such a manner that the shutter flaps 42 of each of the annuluses 40a, 40b, 40c, and 40d are superposed on one another. Thus, in elevation view, only the annulus 40a carrying six shutter flaps 42 can be seen.

Furthermore, still for a given annular duct 20, each annulus 40 includes means for driving the annulus that is immediately adjacent thereto, e.g. respective abutments.

Thus, when it is desired to reduce the flow rate of solid particles passing into a given annular duct 20, the handle 44 is moved in the direction for deploying the shutter flaps 42 like a fan.

For example, when the handle 44 that is secured to the annulus 40a is moved that causes said annulus 40a to turn so as to pivot relative to the annulus 40b adjacent thereto until the drive means carried by these two annuluses 40a and 40b co-operate with one another, i.e. once the first annulus 40a is fully deployed relative to the second annulus 40b and the shutter flaps 42 of these two annuluses are deployed. The first and second annuluses 40a and 40b are then driven to turn relative to the third annulus 40c and they move until the drive means carried by the second and third annuluses 40b and 40c co-operate with one another, and so on until all of the annuluses 40a, 40b, 40c, and 40d, and thus all of the shutter flaps 42 are fully deployed.

Conversely, when it is desired to increase the flow rate of solid particles passing into an annular duct, the handle 44 that controls the movement of the shutter flaps 42 is moved in the opposite direction.

In another embodiment (not shown), for each annular duct 20, 20', 20", the diaphragm 22 has only two annuluses 40a and 40b, which annuluses carry respective pluralities of flexible shutter flaps 42. Each of these flaps 42 has two ends, each carried by a respective one of the annuluses 40a and 40b. One of the annuluses 40b is stationary and the other annulus 40a is movable relative to the first annulus 40b by pivoting one relative to the other.

When it is desired to reduce the flow rate of solid particles passing through an annular duct 20, the handle 44 controlling the movement of the flaps 42 is moved. This handle 44 is secured to the movable annulus 40a and the ends of the flaps 42 that are connected to the movable annulus 40a move together with the annulus 40a relative to the ends of the flaps 42 that are secured to the stationary annulus 40b. The shutter flaps 42 for a single annular duct 20 are thus deployed, at least in part. When it is desired to increase the flow rate of solid particles passing through an annular duct, the handle 44 is moved in the opposite direction.

It can be understood that by using the above-described device, it is possible to control the extent to which the ducts 20, 20', and 20" are shut off in a manner that is independent from one duct to another, by using the various handles 44, 44', 44".

It should be observed that the invention is not limited to the above-described embodiments. In particular, the flaps 42 could have flexible walls. Furthermore, the number of annular ducts 20, 20', and 20" could be different, as could the number of superposed annuluses of the same diameter, such as the annuluses 40a, 40b, 40c, and 40d.

The invention claimed is:

1. A device for filling a container with solid particles, the device comprising:

annular ducts for passing particles in order to dispense particles uniformly in the container, the ducts being defined by a plurality of vertical nozzles arranged coaxially relative to one another; and a diaphragm arranged upstream from the annular ducts in order to regulate the flow of particles in the annular ducts;

wherein the diaphragm has a plurality of shutter flaps for shutting off the annular ducts, each shutting off an angular sector of a single annular duct, wherein the diaphragm has control means for controlling the movement of the shutter flaps, and configured to enable any one duct to be shut off partially independently of the other ducts, and wherein each shutter flap is a rigid wall carried by at least one annulus and configured to shut off an angular sector of a single annular duct.

2. The device according to claim 1, wherein the control means comprise at least two handles, each handle being configured to control the shutting off of a single annular duct.

3. The device according to claim 1, wherein, for each annular duct, the diaphragm comprises an annulus carrying a plurality of flaps distributed in uniform manner on the annulus.

4. The device according to claim 1, wherein the diaphragm has at least two annuluses of the same diameter mounted to pivot relative to each other about a common axis of rotation and suitable for shutting off the same annular duct, at least in part, by pivoting relative to each other.

5. The device according to claim 4, wherein the diaphragm has a single common handle for controlling the relative pivoting of a plurality of same-diameter annuluses.

6. A method of shutting off the device according to claim 1, in which any one annular duct is shut off at least in part without thereby modifying the extent to which any other annular duct is shut off.

7. A device for filling a container with solid. particles, the device comprising:

annular ducts for passing particles in order to dispense particles uniformly in the container, the ducts being defined by a plurality of vertical nozzles arranged coaxially relative to one another; and a diaphragm arranged upstream from the annular ducts in order to regulate the flow of particles in the annular ducts;

wherein the diaphragm has a plurality of shutter flaps for shutting off the annular ducts, each shutting off an angular sector of a single annular duct, wherein the diaphragm has control means for controlling the movement of the shutter flaps, and configured to enable any one duct to be shut off partially independently of the other ducts, and wherein each shutter flap is a flexible wall carried by two same-diameter annuluses mounted to pivot relative to each other, each flap being configured to shut off an angular sector of a single annular duct.

8. The device according to claim 1, including jets of gas placed in register with the downstream ends of the vertical nozzles and forming means for propelling solid particles.

9. The device according to claim 1, including solid particle distributor means.

10. The device according to claim 3, wherein the number of flaps is in the range 2 to 20.

11. The device according to claim 7, wherein the control means comprise at least two handles, each handle being configured to control the shutting off of a single annular duct.

12. The device according to claim 7, wherein, for each annular duct, the diaphragm comprises an annulus carrying a plurality of flaps distributed in uniform manner on the annulus.

13. The device according to claim 7, wherein the diaphragm has at least two annuluses of the same diameter mounted to pivot relative to each other about a common axis of rotation and suitable for shutting off the same annular duct, at least in part, by pivoting relative to each other.

14. The device according to claim 13, wherein the diaphragm has a single common handle for controlling the relative pivoting of a plurality of same-diameter annuluses.

15. The device according to claim 7, including jets of gas placed in register with the downstream ends of the vertical nozzles and forming means for propelling solid particles.

16. The device according to claim 7, including a solid particle distributor means.

17. A method of shutting off the device according to claim 7, in which any one annular duct is shut off at least in part without thereby modifying the extent to which any other annular duet is shut off.

18. The device according to claim 12, wherein the number of flaps is in the range 2 to 20.

* * * * *